United States Patent
Goto

(10) Patent No.: US 10,815,594 B2
(45) Date of Patent: Oct. 27, 2020

(54) SEWING DEVICE AND SEWING METHOD

(71) Applicant: MATSUYA R&D CO., LTD., Fukui (JP)

(72) Inventor: Hidetaka Goto, Fukui (JP)

(73) Assignee: MATSUYA R&D CO., LTD., Fukui (JP)

( * ) Notice: Subject to any disclaimer, the term of this patent is extended or adjusted under 35 U.S.C. 154(b) by 8 days.

(21) Appl. No.: 16/096,453

(22) PCT Filed: Apr. 28, 2017

(86) PCT No.: PCT/JP2017/017017
§ 371 (c)(1),
(2) Date: Oct. 25, 2018

(87) PCT Pub. No.: WO2017/188444
PCT Pub. Date: Nov. 2, 2017

(65) Prior Publication Data
US 2019/0119842 A1    Apr. 25, 2019

(30) Foreign Application Priority Data

Apr. 28, 2016 (JP) .................................. 2016-091556
Apr. 26, 2017 (JP) .................................. 2017-087527

(51) Int. Cl.
*D05B 21/00* (2006.01)
*D05B 19/16* (2006.01)
*D05B 39/00* (2006.01)

(52) U.S. Cl.
CPC ............. *D05B 21/00* (2013.01); *D05B 19/16* (2013.01); *D05B 39/00* (2013.01)

(58) Field of Classification Search
CPC ........ D05B 21/00; D05B 19/16; D05B 39/00; D05B 33/00; D05B 33/02
See application file for complete search history.

(56) References Cited

U.S. PATENT DOCUMENTS 4,989,525 A * 2/1991 Portilla ................. B60R 21/235
                                                                 112/10
5,313,897 A * 5/1994 Katamine ............ B25J 15/0019
                                                                 112/470.13
(Continued)

FOREIGN PATENT DOCUMENTS

CN       101205662 A       6/2008
CN       102084642 A       6/2011
(Continued)

OTHER PUBLICATIONS

Schrimpf Johannes et al; Model-Based Feed-Forward and Setpoint Generation in a Multi-Robot Sewing Cell; 2015—IEEE International Conference on Robotics and Automation (ICRA), IEEE, May 26, 2015, pp. 2027-2033,XP033168678.
(Continued)

*Primary Examiner* — Danny Worrell
(74) *Attorney, Agent, or Firm* — Bacon & Thomas, PLLC

(57) ABSTRACT

The invention provides a sewing device which can precisely and evenly carry out a great variety of sewing works further with a good productivity. The sewing device has a sewing machine (2), and a dual-arm robot (7) having a first arm (5) and a second arm (6) which can operate an object to be sewn (4) supplied to a sewing motion portion (3) of the sewing machine. The duel-arm robot is provided with a camera which can image the sewing motion portion. Further, the sewing device is provided with an image processing portion which processes an image information acquired by the camera, and a command transmitting portion which transmits commands to an arm control portion controlling the first arm and the second arm on the basis of a processing result of the image processing portion.

8 Claims, 5 Drawing Sheets

(56) References Cited

U.S. PATENT DOCUMENTS

| | | | | |
|---|---|---|---|---|
| 5,381,743 A * | 1/1995 | Moll | ............... | D05B 23/00 |
| | | | | 112/2.1 |
| 5,875,726 A * | 3/1999 | Keilmann | ............. | B25J 9/0084 |
| | | | | 112/470.13 |
| 5,988,085 A | 11/1999 | Martz | | |
| 6,129,031 A * | 10/2000 | Sarh | ............... | D05B 23/00 |
| | | | | 112/470.13 |
| 10,178,991 B2 * | 1/2019 | Bailly | ............... | D04B 21/202 |
| 10,240,271 B2 * | 3/2019 | Freer | ............... | B25J 11/00 |
| 10,358,754 B2 * | 7/2019 | Sano | ............... | D05B 55/14 |
| 2012/0234221 A1 * | 9/2012 | Brunner | ............... | D05B 65/02 |
| | | | | 112/300 |
| 2017/0260670 A1 * | 9/2017 | Freer | ............... | B25J 11/00 |
| 2017/0275798 A1 * | 9/2017 | Harada | ............... | D05B 33/006 |
| 2018/0044830 A1 * | 2/2018 | Kadowaki | ............... | D05B 29/06 |
| 2018/0080155 A1 * | 3/2018 | Sano | ............... | B25J 19/023 |
| 2019/0119842 A1 * | 4/2019 | Goto | ............... | D05B 39/00 |
| 2019/0353476 A1 * | 11/2019 | Takeda | ............... | D05B 19/12 |
| 2019/0376217 A1 * | 12/2019 | Hiraoka | ............... | D05B 35/102 |

FOREIGN PATENT DOCUMENTS

| | | | |
|---|---|---|---|
| CN | 104695139 A | | 6/2015 |
| CN | 104727022 A | | 6/2015 |
| JP | S61173391 A | | 8/1986 |
| JP | S62102796 A | | 5/1987 |
| JP | H02131888 A | | 5/1990 |
| JP | H0334755 A | | 2/1991 |
| JP | H0484989 A | | 3/1992 |
| JP | H059802 A | | 1/1993 |
| JP | H08257273 A | | 10/1996 |
| JP | H11509757 A | | 8/1999 |
| JP | 2000197783 A | | 7/2000 |
| JP | 2015066380 A | | 4/2015 |

OTHER PUBLICATIONS

Schrimpf Johannes et al; "Velocity Coordinaton and Corner, Matching in a Multi-Robot Sewing Cell" 2014 IEEE/RSJ International Conference on Intelligent Robots and Systems, IEEE, Sep. 14, 2014, pp. 4476-4481, XP032676587.

Extended European Search Report Issued in Corresponding European Appl. No. 17789725.3 dated Dec. 2, 2019.

Chinese Office Action dated Jun. 2, 2020 in corresponding Chinese Patent Appln. No. 201780026132.3.

* cited by examiner

SEWING DEVICE AND SEWING METHOD

TECHNICAL FIELD

The present invention relates to a sewing device which can carry out great variety of sewing works with good precision, evenly and with good productivity, and also relates to a sewing method which is carried out by using the same.

BACKGROUND ART

Basic patterns of sewing are exemplified as follows:

(1) a fixed position sewing pattern structured such as to overlap first and second object to be sewn while aligning side portions of portions to be sewn of both the objects, and sew the overlapping portions of the portion to be sewn while making a distance thereof from the side portions fixed;

(2) a fixed length sewing pattern structured such as to overlap the portion to be sewn of the first and second objects to be sewn while aligning both end portions of both the portions to be sewn as seen from a sewing direction, and sew the overlapping portions of the portions to be sewn;

(3) a corrected sewing pattern structured such that in the case that any one of the portion to be sewn of the first object to be sewn and the portion to be sewn of the second object to be sewn increases its length due to elongation thereof during the sewing when applying the fixed length sewing pattern, the end portions are finally aligned with each other in a leading end in the sewing direction by sewing while desirably pulling a leading side portion of the other portion to be sewn as seen from the sewing direction toward the leading side in the sewing direction;

(4) a jig utilization sewing pattern structured such as to grip both side positions of a jig retaining the object to be sewn and moving the jig in such a manner that a sewing machine can desirably sews the object to be sewn retained by the jig.

The sewing patterns have conventionally achieved by a manual work of a skilled worker in a normal case.

Conventionally, the sewing work specialized in a particular sewing pattern has been carried out by using sewing devices, for example, as disclosed in patent literatures 1, 2, 3 and 4. However, several kinds of sewing devices have been required for carrying out the great variety of sewing patterns, and a cost of equipment has been expensive. Further, a lot of installation space is required. As a result, there has been a problem that a sewing cost is increased.

CITATION LIST

Patent Literature

PATENT LITERATURE 1: Japanese Unexamined Patent Publication No. 2000-197783
PATENT LITERATURE 2: Japanese Unexamined Patent Publication No. 5-9802
PATENT LITERATURE 3: Japanese Unexamined Patent Publication No. 4-84989
PATENT LITERATURE 4: Japanese Unexamined Patent Publication No. 3-34755

SUMMARY OF INVENTION

Technical Problem

The present invention is made by taking the conventional problem mentioned above into consideration, and an object of the present invention is to provide a sewing device and a sewing method which can precisely and evenly carry out a great variety of sewing works and can further carry out the sewing works with a good productivity regardless of a two-dimensional sewing work and a three-dimensional sewing work.

Solution to Problem

In order to achieve the object mentioned above, the present invention employs the following means.

More specifically, a first aspect of a sewing device according to the present invention includes a sewing machine, a dual-arm robot having a first arm and a second arm which can operate an object to be sewn supplied to a sewing motion portion of the sewing machine by a program control means, a camera which is provided in the dual-arm robot and can image the sewing motion portion, an image processing portion which processes an image information acquired by the camera, and a command transmitting portion which transmits commands to an arm control portion controlling the first arm and the second arm on the basis of a processing result of the image processing portion.

A second aspect of the sewing device according to the present invention includes a sewing machine, a dual-arm robot having a first arm and a second arm which can operate an object to be sewn supplied to a sewing motion portion of the sewing machine by a program control means, a camera which is provided in the dual-arm robot and can image the sewing motion portion, an image processing portion which processes an image information acquired by the camera, and a command transmitting portion which transmits commands to an arm control portion controlling the first arm and the second arm on the basis of a processing result of the image processing portion. Further, the program control means includes an overlapping control means which overlaps the portion to be sewn of the first object to be sewn and the portion to be sewn of the second object to be sewn while aligning side portions of both the objects with each other, a supply control means which supplies overlapping portions of the portions to be sewn to the sewing motion portion, and a movement control means which moves the overlapping portions synchronously with the sewing machine in such a manner that the sewing operation of the sewing machine is carried out in a state in which distances from the side portions are fixed.

A third aspect of the sewing device according to the present invention includes a sewing machine, a dual-arm robot having a first arm and a second arm which can operate an object to be sewn supplied to a sewing motion portion of the sewing machine by a program control means, a camera which is provided in the dual-arm robot and can image the sewing motion portion, an image processing portion which processes an image information acquired by the camera, and a command transmitting portion which transmits commands to an arm control portion controlling the first arm and the second arm on the basis of a processing result of the image processing portion. Further, the program control means includes an overlapping control means which overlaps the portion to be sewn of the first object to be sewn and the portion to be sewn of the second object to be sewn while aligning respective both end portions as seen from a sewing direction with each other, a supply control means which supplies overlapping portions of the portions to be sewn to the sewing motion portion, and a movement control means which moves the overlapping portions synchronously with the sewing machine in such a manner that the sewing operation of the sewing machine is applied to the overlapping portions.

A fourth aspect of the sewing device according to the present invention includes a sewing machine, a dual-arm robot having a first arm and a second arm which can operate an object to be sewn supplied to a sewing motion portion of the sewing machine by a program control means, a camera which is provided in the dual-arm robot and can image the sewing motion portion, an image processing portion which processes an image information acquired by the camera, and a command transmitting portion which transmits commands to an arm control portion controlling the first arm and the second arm on the basis of a processing result of the image processing portion. Further, the program control means includes an overlapping control means which overlaps the portion to be sewn of the first object to be sewn and the portion to be sewn of the second object to be sewn while aligning respective both end portions as seen from a sewing direction with each other, a supply control means which supplies overlapping portions of the portions to be sewn to the sewing motion portion, and a movement control means which moves the overlapping portions synchronously with the sewing machine in such a manner that the sewing operation of the sewing machine is applied to the overlapping portions. Further, the sewing device includes a pulling control means which in the case that any one of the portion to be sewn of the first object to be sewn and the portion to be sewn of the second object to be sewn elongates and increases its length during the sewing, desirably pulls a leading end portion as seen from the sewing direction of the other portion to be sewn toward a leading side in the sewing direction by the first arm and/or the second arm.

A fifth aspect of the sewing device according to the present invention includes a sewing machine, a dual-arm robot having a first arm and a second arm which can operate an object to be sewn supplied to a sewing motion portion of the sewing machine by a program control means, a camera which is provided in the dual-arm robot and can image the sewing motion portion, an image processing portion which processes an image information acquired by the camera, and a command transmitting portion which transmits commands to an arm control portion controlling the first arm and the second arm on the basis of a processing result of the image processing portion. Further, the program control means includes an overlapping control means which overlaps the portion to be sewn of the first object to be sewn and the portion to be sewn of the second object to be sewn, a supply control means which supplies overlapping portions of the portions to be sewn to the sewing motion portion, and a movement control means which moves the overlapping portions synchronously with the sewing machine in such a manner that the sewing operation of the sewing machine is applied to the overlapping portions, and the movement control means retains an unsewn overlapping portion connected to the overlapping portion under the sewing in a state in which the first arm and/or the second arm slips when the movement control means moves the overlapping portions.

A sixth aspect of the sewing device according to the present invention includes a sewing machine, a dual-arm robot having a first arm and a second arm which can operate an object to be sewn supplied to a sewing motion portion of the sewing machine by a program control means, a camera which is provided in the dual-arm robot and can image the sewing motion portion, an image processing portion which processes an image information acquired by the camera, and a command transmitting portion which transmits commands to an arm control portion controlling the first arm and the second arm on the basis of a processing result of the image processing portion. Further, the program control means includes a supply control means which controls motions of the first arm and/or the second arm retaining a jig supporting the object to be sewn in such a manner as to supply the jig to the sewing motion portion, and a movement control means which moves the jig synchronously with the sewing machine in such a manner that the sewing operation of the sewing machine is applied to the object to be sewn supported by the jig.

A first aspect of a sewing method according to the present invention is a sewing method using the sewing device according to the first aspect mentioned above, and includes a step of making the first object to be sewn be retained by the first arm and making the second object to be sewn be retained by the second arm according to a desired motion of the first arm and the second arm which is carried out on the basis of image information acquired by the camera, a step of overlapping the portion to be sewn of the first object to be sewn and the portion to be sewn of the second object to be sewn while aligning side portions of both the objects with each other, a step of supplying the overlapping portions of the portions to be sewn to the sewing motion portion, and a step of moving the overlapping portions synchronously with the sewing machine in such a manner that the sewing operation of the sewing machine is carried out in a state in which a distance from the side portion is fixed.

A second aspect of the sewing method according to the present invention is a sewing method using the sewing device according to the first aspect mentioned above, and includes a step of making the first object to be sewn be retained by the first arm and making the second object to be sewn be retained by the second arm according to a desired motion of the first arm and the second arm which is carried out on the basis of image information acquired by the camera, a step of overlapping the portion to be sewn of the first object to be sewn and the portion to be sewn of the second object to be sewn while aligning both end portions as seen from a sewing direction with each other, a step of supplying the overlapping portions of the portions to be sewn to the sewing motion portion, and a step of moving the overlapping portions synchronously with the sewing machine in such a manner that the sewing operation of the sewing machine is applied to the overlapping portion.

A third aspect of the sewing method according to the present invention is a sewing method using the sewing device according to the first aspect mentioned above, and includes a step of making the first object to be sewn be retained by the first arm and making the second object to be sewn be retained by the second arm according to a desired motion of the first arm and the second arm which is carried out on the basis of image information acquired by the camera, a step of overlapping the portion to be sewn of the first object to be sewn and the portion to be sewn of the second object to be sewn while aligning both end portions as seen from a sewing direction with each other, a step of supplying the overlapping portions of the portions to be sewn to the sewing motion portion, a step of moving the overlapping portions synchronously with the sewing machine in such a manner that the sewing operation of the sewing machine is applied to the overlapping portion, and a step of in the case that any one of the portion to be sewn of the first object to be sewn and the portion to be sewn of the second object to be sewn elongates and increases its length during the sewing, desirably pulling a leading end portion as seen from the sewing direction of the other portion to be sewn toward a leading side in the sewing direction by the first arm and/or the second arm, thereby finally aligning end portions of the portion to be sewn of the first object to be sewn and the portion to be sewn of the second object to be sewn with each other in the leading side of the sewing direction.

A fourth aspect of the sewing method according to the present invention is a sewing method using the sewing device according to the first aspect mentioned above, and includes a step of making the first object to be sewn be retained by the first arm and making the second object to be sewn be retained by the second arm according to a desired motion of the first arm and the second arm which is carried out on the basis of image information acquired by the camera, a step of overlapping the portion to be sewn of the first object to be sewn and the portion to be sewn of the second object to be sewn while aligning both end portions as seen from a sewing direction with each other, a step of supplying the overlapping portions of the portions to be sewn to the sewing motion portion, a step of moving the overlapping portions synchronously with the sewing machine in such a manner that the sewing operation of the sewing machine is applied to the overlapping portion, and a step of gripping unsewn overlapping portions connected to the overlapping portions under the sewing in a slipping state by the first arm and/or the second arm when moving the overlapping portions.

A fifth aspect of the sewing method according to the present invention is a sewing method using the sewing device according to the first aspect mentioned above, and includes a step of retaining a jig supporting the object to be sewn by the first arm and/or the second arm, and a step of supplying the jig to the sewing motion portion according to a desired motion of the first and second arms carried out on the basis of image information acquired by the camera, and moving the jig synchronously with the sewing machine in such a manner that the sewing operation of the sewing machine is applied to the object to be sewn supported by the jig.

Effect of the Invention

The present invention can precisely and evenly carry out great variety of sewing works and can further carry out with a good productivity the sewing works regardless of a two-dimensional sewing work and a three-dimensional sewing work by employing the structures mentioned above.

DESCRIPTION OF EMBODIMENT

Embodiment 1

Figure 1:
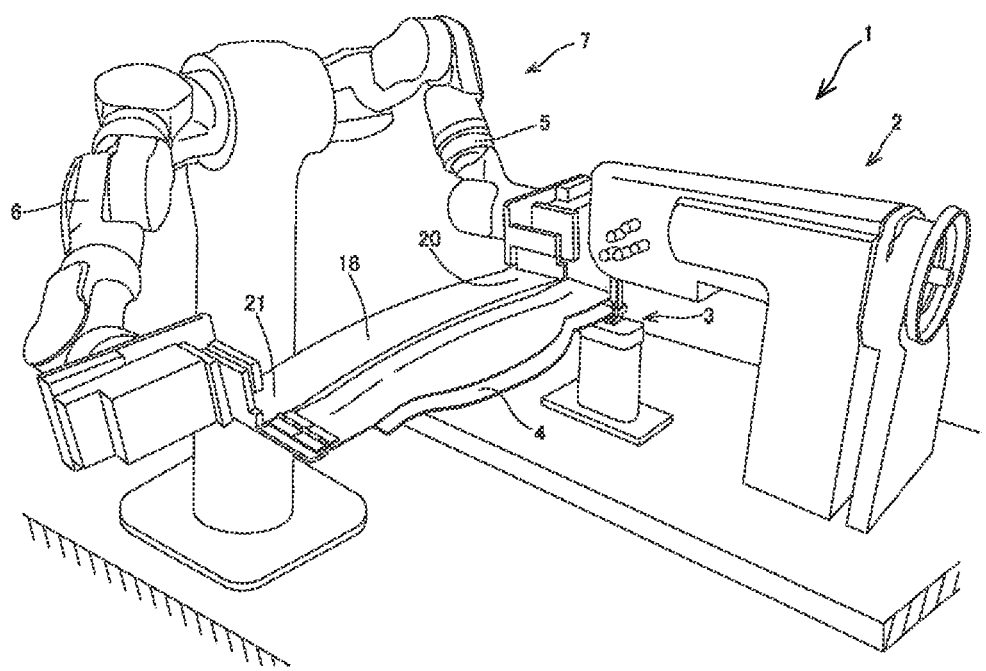
FIG. 1 is a perspective view describing a sewing device according to the present invention.

In FIG. 1, a sewing device 1 according to the present invention is provided with a sewing machine 2, a dual-arm robot 7 having an articulated first arm 5 and an articulated second arm 6 which can operate an object to be sewn 4 supplied to a sewing motion portion 3 of the sewing machine 2 by a program control means, a camera which is provided in the dual-arm robot 7 and can image the sewing motion portion 3, an image processing portion which processes image information acquired by the camera, and a command transmitting portion which transmits a command to an arm control portion controlling the first arm 5 and the second arm 6 on the basis of a processing result of the image processing portion.

A description will be next given of a typical sewing method which can be carried out by using the sewing device 1 mentioned above.

Figure 2A:
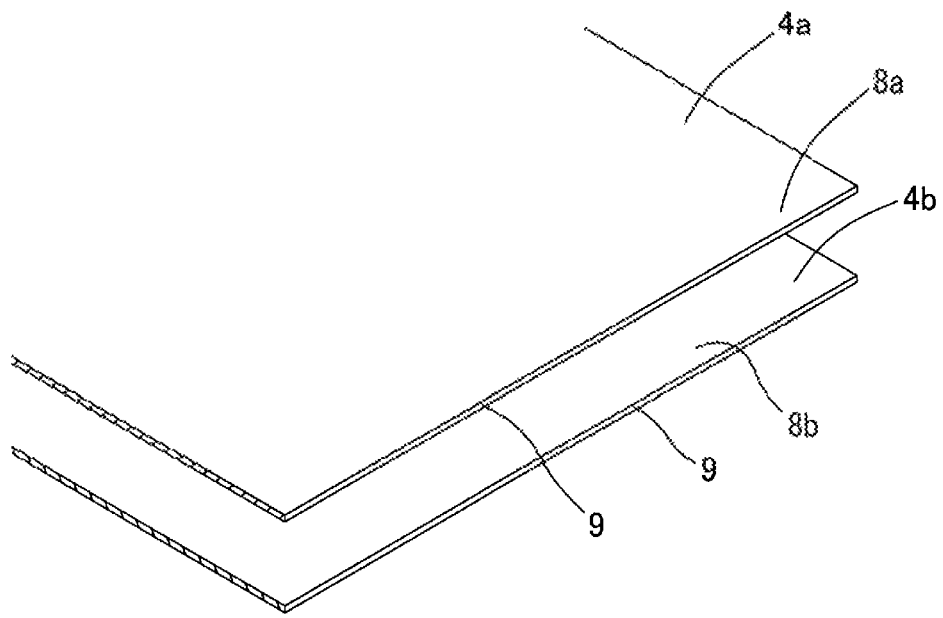
FIGS. 2A to 2B are explanatory view showing an example of a sewing pattern.
Figure 2B:
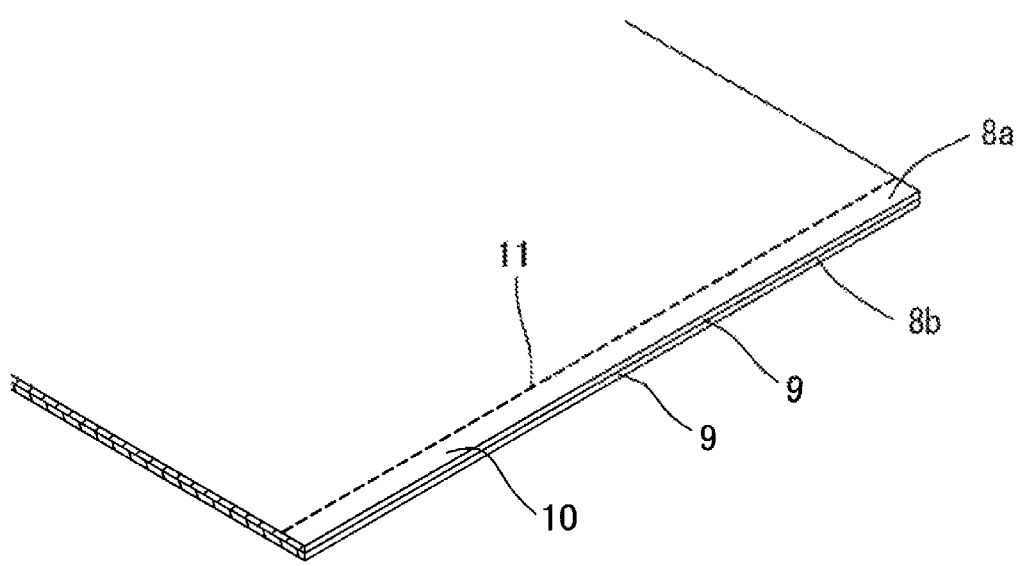

An example of the sewing method relates to an implementation of the fixed position sewing pattern. Describing this on the basis of FIGS. 2A to 2B, according to a desired motion of the first arm 5 and the second arm 6 which is carried out on the basis of the image information acquired by the camera, the method makes a first object to be sewn 4a be desirably retained by the first arm 5 and makes a second object to be sewn 4b be desirably retained by the second arm 6. The method overlaps a portion to be sewn 8a of the first object to be sewn 4a and a portion to be sewn 8b of the second object to be sewn 4b while aligning side portions 9 and 9 of both the objects with each other as shown in FIG. 2B, supplies overlapping portions 10 of the portions to be sewn 8a and 8b to the sewing motion portion 3 of the sewing machine 2, and moving the overlapping portions 10 synchronously with the sewing machine 2 in such a manner that a sewing operation 11 of the sewing machine 2 is carried out in a state in which a distance from the side portion 9 is fixed.

The sewing device 1 for implementing the sewing method is more specifically a sewing device having the basic structure mentioned above. The program control means is provided with an overlapping control means which overlaps the portion to be sewn 8a of the first object to be sewn 4a and the portion to be sewn 8b of the second object to be sewn 4b while aligning the side portions 9 and 9 of both the objects with each other, a supply control means which supplies the overlapping portions 10 of the portions to be sewn 8a and 8b to the sewing motion portion 3 of the sewing machine 2, and a movement control means which moves the overlapping portions 10 synchronously with the sewing machine 2 in such a manner that the sewing work of the sewing machine 2 can be carried out in a state in which the distance from the side portion 9 is fixed.

The other example of the sewing method relates to an implementation of the fixed length sewing pattern. Describing this on the basis of FIGS. 3A to 3B, according to a desired motion of the first arm 5 and the second arm 6 which is carried out on the basis of the image information acquired by the camera, the method makes the first object to be sewn 4a be desirably retained by the first arm 5 and makes the second object to be sewn 4b be desirably retained by the second arm 6. The method overlaps the portion to be sewn 8a of the first object to be sewn 4a and the portion to be sewn 8b of the second object to be sewn 4b while aligning both end portions 12, 13, 14 and 15 as seen from a sewing direction with each other as shown in FIG. 3B, supplies the overlapping portions 10 of the portions to be sewn 8a and 8b to the sewing motion portion 3 of the sewing machine 2, and moving the overlapping portions 10 synchronously with the sewing machine 2 in such a manner that the sewing operation of the sewing machine 2 is applied to the overlapping portions 10.

The sewing device 1 for implementing the sewing method is more specifically a sewing device having the basic structure mentioned above. The program control means is provided with an overlapping control means which overlaps the portion to be sewn 8a of the first object to be sewn 4a and the portion to be sewn 8b of the second object to be sewn 4b while aligning both the end portions 12, 13, 14 and 15 as seen from the sewing direction with each other, a supply control means which supplies the overlapping portions 10 of the portions to be sewn 8a and 8b to the sewing motion portion 3 of the sewing machine 2, and a movement control means which moves the overlapping portions 10 synchronously with the sewing machine 2 in such a manner that the sewing work of the sewing machine 2 is applied to the overlapping portion 10.

Further, the other example of the sewing method mentioned above relates to an implementation of the corrected sewing pattern. The method sews while appropriately correcting in the case that any one of the portion to be sewn 8a of the first object to be sewn 4a and the portion to be sewn 8b of the second object to be sewn 4b elongates and increases its length during the sewing when moving the overlapping portion 10 synchronously with the sewing machine 2 in such a manner that the sewing work of the sewing machine 2 is applied to the overlapping portion 10, in the sewing method which implements the fixed length sewing pattern described on the basis of FIGS. 3A to 3B. Describing this on the basis of FIGS. 4A to 4C, end portions 14 and 15 of the first object to be sewn 4a and the second object to be sewn 4b in a leading side of the sewing direction are finally aligned with each other by applying the sewing work while desirably pulling a leading end portion 16 of the other object to be sewn as seen from the sewing direction toward the leading side in the sewing direction by the first arm 5 or the second arm 6 or both the arms (a pulling state is shown by an arrow F described in FIG. 4B), for correction.

The sewing device 1 for implementing the sewing method is more specifically a sewing device having the basic structure mentioned above. The program control means is provided with the overlapping control means which overlaps the portion to be sewn 8a of the first object to be sewn 4a and the portion to be sewn 8b of the second object to be sewn 4b while aligning both the end portions 12, 13, 14 and 15 as seen from the sewing direction with each other, the supply control means which supplies the overlapping portions 10 of the portions to be sewn 8a and 8b to the sewing motion portion 3 of the sewing machine 2, and the movement control means which moves the overlapping portions 10 synchronously with the sewing machine 2 in such a manner that the sewing work of the sewing machine 2 is applied to the overlapping portion 10. Further, the sewing device includes a pulling control means which in the case that any one of the portion to be sewn 8a of the first object to be sewn 4a and the portion to be sewn 8b of the second object to be sewn 4b elongates and increases its length during the sewing, desirably pulls a leading end portion 16 as seen from the sewing direction of the other portion to be sewn toward a leading side in the sewing direction by the first arm 5 or the second arm 6, or both of them.

Figure 3A:
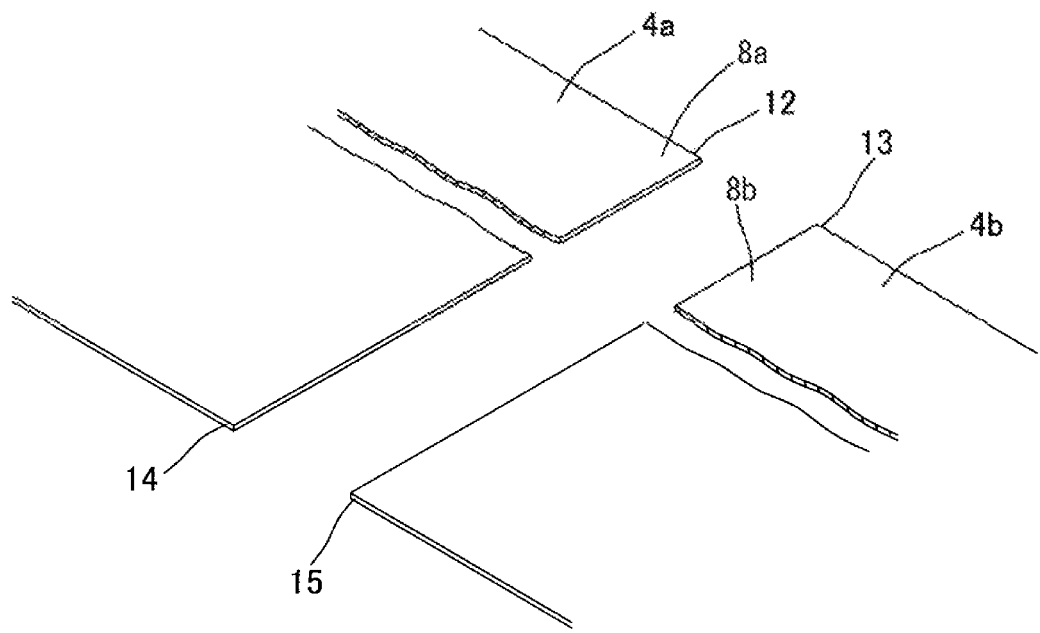
FIGS. 3A to 3B are explanatory view showing the other example of the sewing pattern.
Figure 3B:
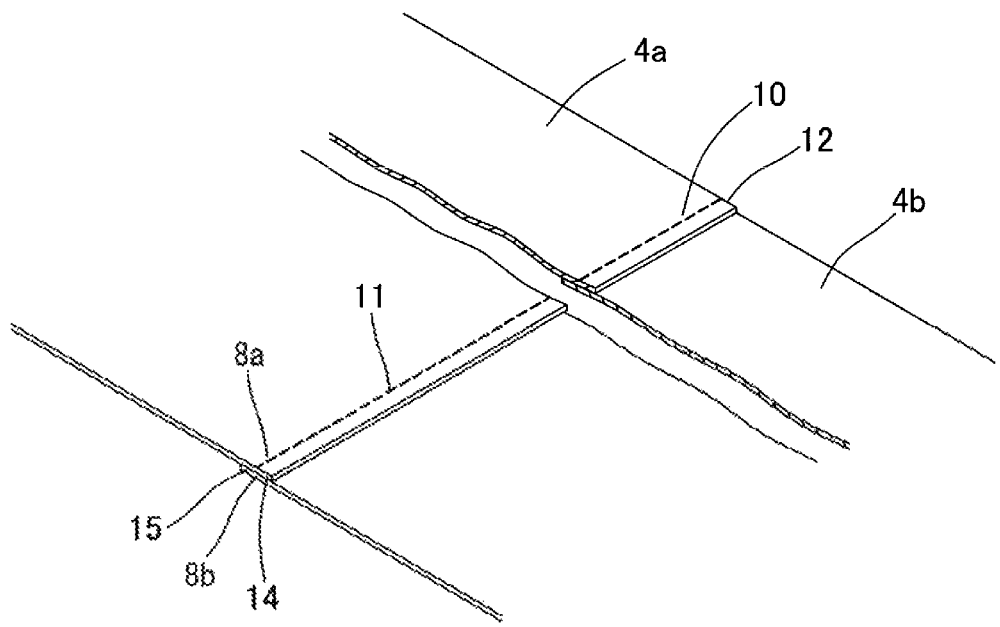
Figure 4A:
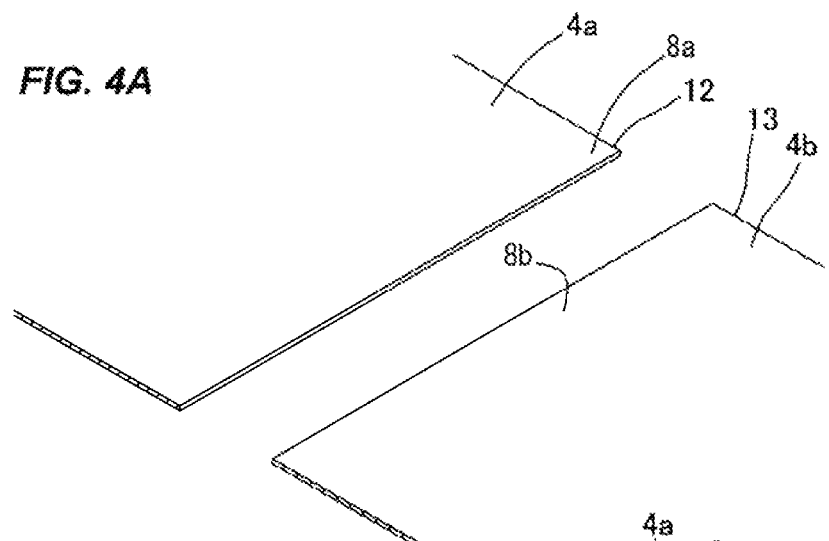
FIGS. 4A to 4C are explanatory view showing further the other example of the sewing pattern.
Figure 4B:
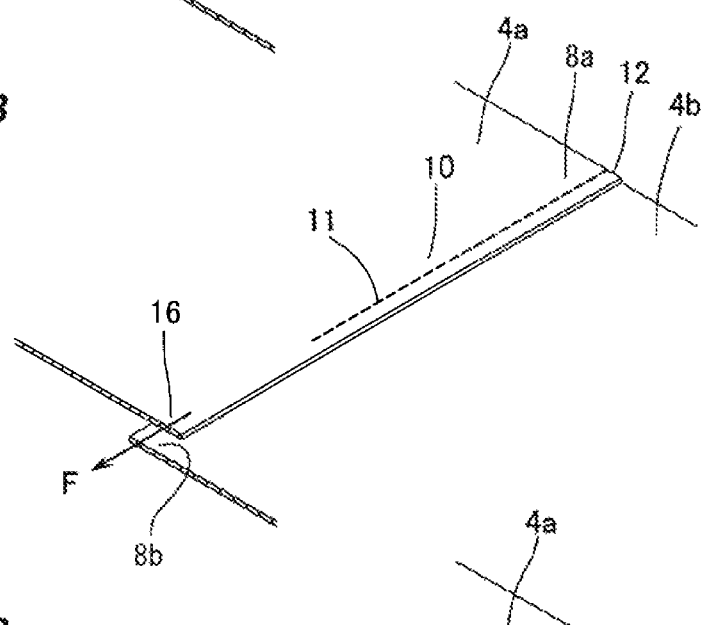
Figure 4C:
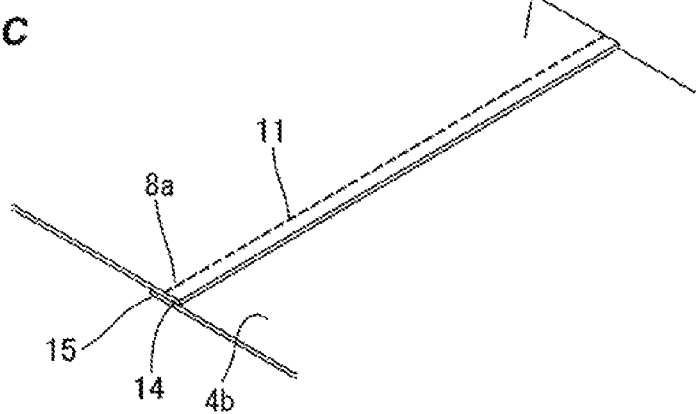

Further, the other example of the sewing method mentioned includes a step of making the first object to be sewn 4a be desirably gripped by the first arm 5 and making the second object to be sewn 4b be desirably gripped by the second arm according to a desired motion of the first arm 5 and the second arm 6 which is carried out on the basis of image information acquired by the camera, a step of overlapping the portion to be sewn 8a of the first object to be sewn 4a and the portion to be sewn 8b of the second object to be sewn 4b, a step of supplying the overlapping portions 10 of the portions to be sewn 8a and 8b to the sewing motion portion 3 of the sewing machine 2, a step of moving the overlapping portions 10 synchronously with the sewing machine in such a manner that the sewing operation of the sewing machine is applied to the overlapping portion 10, and a step of retaining unsewn overlapping portions connected to the overlapping portions under the sewing in a slipping state by the first arm and/or the second arm 6 when moving the overlapping portions 10, for example, in the sewing method which implements the fixed length sewing pattern described on the basis of FIGS. 3A to 3B.

The sewing device for implementing the sewing method is more specifically a sewing device having the basic structure mentioned above. The program control means is provided with the overlapping control means which overlaps the portion to be sewn 8a of the first object to be sewn 4a and the portion to be sewn 8b of the second object to be sewn 4b, the supply control means which supplies the overlapping portions 10 of the portions to be sewn 8a and 8b to the sewing motion portion 3 of the sewing machine 2, and the movement control means which moves the overlapping portions 10 synchronously with the sewing machine 2 in such a manner that the sewing work of the sewing machine 2 is applied to the overlapping portion 10. Further, the movement control means retains the unsewn overlapping portion connected to the overlapping portion under the sewing in a state in which the first arm 5 or the second arm 6, or both of them slips when the movement control means moves the overlapping portions 10.

Further, the other example of the sewing method mentioned above is structured, as shown in FIG. 1, such as to retain, for example, both side positions 20 and 21 of a jig 18 supporting the object to be sewn 4 by the first arm 5 and the second arm 6, supply the jig 18 to the sewing motion portion 3 of the sewing machine 2 according to a desired motion of the first arm 5 and the second arm 6 carried out on the basis of image information acquired by the camera, and move the jig 18 synchronously with the sewing machine 2 in such a manner that the sewing operation of the sewing machine 2 is applied to the object to be sewn 4 supported by the jig 18. In the case that the jig 18 is comparatively short, the one arm may retain the jig 18, and the other arm may do the other works. For example, the other arm may go and pick up a new jig 18 or may discharge the jig 18 which finishes the sewing. Further, in the case that the jig 18 is long, a desired sewing work can be applied sequentially to the object to be sewn 4 according to an appropriate changing motion of the jig 18 by the first arm 5 and the second arm 6.

The sewing device for implementing the sewing method is more specifically a sewing device having the basic structure mentioned above. The program control means is provided with a supply control means which controls the motion of the first arm 5 and/or the second arm 6 retaining the jig 18 supporting the object to be sewn 4 in such a manner as to supply the jig 18 to the sewing motion portion 3, and a movement control means which moves the jig 18 synchronously with the sewing machine 2 in such a manner that the sewing operation of the sewing machine 2 is applied to the object to be sewn 4 supported by the jig 18.

Figure 5:
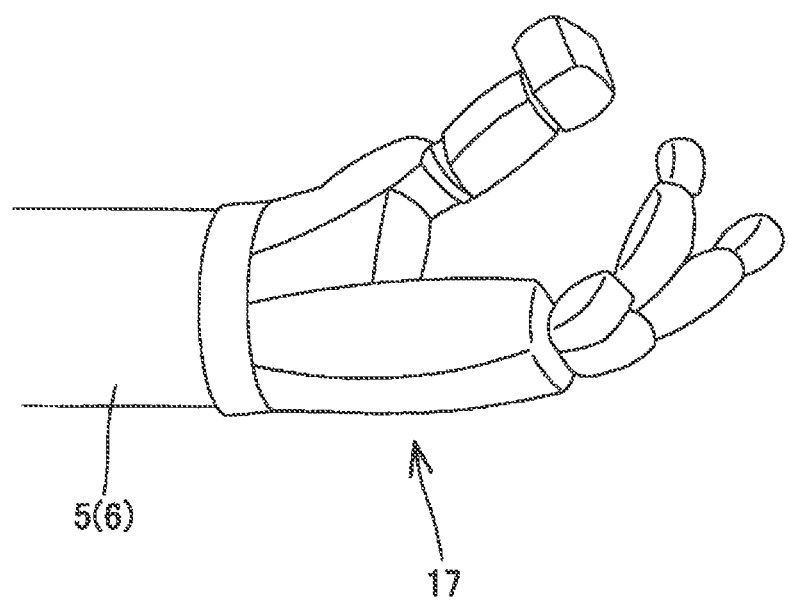
FIG. 5 is a perspective view exemplifying an arm having an articulated finger portion.

In these sewing methods, the motion that the first and second arms 5 and 6 desirably retain the object to be sewn 4 or pull the end portion of the object to be sewn 4 can be achieved by the provision of a desired gripping portion such as an articulated finger portion 17, for example, as shown in FIG. 5, in the leading end portion of the arm.

Embodiment 2

It goes without saying that the present invention is not limited to the structures shown by the embodiments, but can be variously modified its design within the description in claims. One of them is exemplified as follows.

(1) The great variety of sewing works can be carried out by cooperation of the first arm 5 and the second arm 6. For this purpose, a desired retention portion is provided in the first arm 5 and the second arm 6.

(2) In the retention of the first object to be sewn 4a by the first arm 5, and the retention of the second object to be sewn 4b by the second arm 6, it is possible to employ the retention by an air adsorption action and the retention by a desired sticking of a needle-like member in addition to the gripping of them, as long as the first and second objects to be sewn 4a and 4b can be operably retained.

(3) The camera can be provided at a desired position which can image the sewing motion portion 3, for example, a desired position of the first arm 5 and a desired position of the second arm 6, in addition to the desired position in the body portion of the dual-arm robot 7.

(4) The object to be sewn 4 may be made of the other raw materials which can be sewn, for example, leather, in addition to the fabric. Further, the sewing work can be applied to various objects such as the clothing, the shoe, the bag and the automotive associated part.

(5) The number of the overlapping objects to be sewn 4 can be set desirably within a range that the sewing machine 2 can sew.

(6) The dual-arm robot 7 may be provided with a monitor.

REFERENCE SIGNS LIST

1: device
2: sewing machine
3: sewing motion portion
4: object to be sewn
4a: first object to be sewn
4b: second object to be sewn
5: first arm
6: second arm
7: dual-arm robot
8a: portion to be sewn
8b: portion to be sewn
9: side portion
10: overlapping portion
11: sewing work
12: end portion
13: end portion
14: end portion
15: end portion
16: leading end portion
17: articulated finger portion
18: jig
20: side position
21: side position

The invention claimed is:
1. A sewing device comprising:
a sewing machine;
a dual-arm robot having a first arm and a second arm which can operate an object to be sewn supplied to a sewing motion portion of the sewing machine by a program control means;
a camera which is provided in the dual-arm robot and can image the sewing motion portion;
an image processing portion which processes an image information acquired by the camera; and
a command transmitting portion which transmits commands to an arm control portion controlling the first arm and the second arm on the basis of a processing result of the image processing portion,
wherein the program control means comprises:
an overlapping control means which overlaps the portion to be sewn of the first object to be sewn and the portion to be sewn of the second object to be sewn while aligning side portions of both the objects with each other;
a supply control means which supplies overlapping portions of the portions to be sewn to the sewing motion portion; and
a movement control means which moves the overlapping portions synchronously with the sewing machine in such a manner that the sewing operation of the sewing machine is carried out in a state in which distances from the side portions are fixed.

2. A sewing device comprising:
a sewing machine;
a dual-arm robot having a first arm and a second arm which can operate an object to be sewn supplied to a sewing motion portion of the sewing machine by a program control means;
a camera which is provided in the dual-arm robot and can image the sewing motion portion;
an image processing portion which processes an image information acquired by the camera; and
a command transmitting portion which transmits commands to an arm control portion controlling the first arm and the second arm on the basis of a processing result of the image processing portion,
wherein the program control means comprises:
an overlapping control means which overlaps the portion to be sewn of the first object to be sewn and the portion to be sewn of the second object to be sewn while aligning respective both end portions as seen from a sewing direction with each other;
a supply control means which supplies overlapping portions of the portions to be sewn to the sewing motion portion; and
a movement control means which moves the overlapping portions synchronously with the sewing machine in such a manner that the sewing operation of the sewing machine is applied to the overlapping portions.

3. A sewing device comprising:
a sewing machine;
a dual-arm robot having a first arm and a second arm which can operate an object to be sewn supplied to a sewing motion portion of the sewing machine by a program control means;
a camera which is provided in the dual-arm robot and can image the sewing motion portion;
an image processing portion which processes an image information acquired by the camera; and
a command transmitting portion which transmits commands to an arm control portion controlling the first arm and the second arm on the basis of a processing result of the image processing portion,
wherein the program control means comprises:
an overlapping control means which overlaps the portion to be sewn of the first object to be sewn and the portion to be sewn of the second object to be sewn while aligning respective both end portions as seen from a sewing direction with each other;

a supply control means which supplies overlapping portions of the portions to be sewn to the sewing motion portion; and a movement control means which moves the overlapping portions synchronously with the sewing machine in such a manner that the sewing operation of the sewing machine is applied to the overlapping portions, and wherein the sewing device comprises:

a pulling control means which in the case that any one of the portion to be sewn of the first object to be sewn and the portion to be sewn of the second object to be sewn elongates and increases its length during the sewing, desirably pulls a leading end portion as seen from the sewing direction of the other portion to be sewn toward a leading side in the sewing direction by the first arm and/or the second arm.

4. A sewing device comprising:

a sewing machine;

a dual-arm robot having a first arm and a second arm which can operate an object to be sewn supplied to a sewing motion portion of the sewing machine by a program control means;

a camera which is provided in the dual-arm robot and can image the sewing motion portion;

an image processing portion which processes an image information acquired by the camera; and a command transmitting portion which transmits commands to an arm control portion controlling the first arm and the second arm on the basis of a processing result of the image processing portion, wherein the program control means comprises:

an overlapping control means which overlaps the portion to be sewn of the first object to be sewn and the portion to be sewn of the second object to be sewn;

a supply control means which supplies overlapping portions of the portions to be sewn to the sewing motion portion; and a movement control means which moves the overlapping portions synchronously with the sewing machine in such a manner that the sewing operation of the sewing machine is applied to the overlapping portions, and wherein the movement control means retains an unsewn overlapping portion connected to the overlapping portion under the sewing in a state in which the first arm and/or the second arm slips when the movement control means moves the overlapping portions.

5. A sewing method using a sewing device, the sewing device comprising:

a sewing machine;

a dual-arm robot having a first arm and a second arm which can operate an object to be sewn supplied to a sewing motion portion of the sewing machine by a program control means;

a camera which is provided in the dual-arm robot and can image the sewing motion portion;

an image processing portion which processes an image information acquired by the camera; and a command transmitting portion which transmits commands to an arm control portion controlling the first arm and the second arm on the basis of a processing result of the image processing portion, and the method comprising:

a step of making the first object to be sewn be retained by the first arm and making the second object to be sewn be retained by the second arm according to a desired motion of the first arm and the second arm which is carried out on the basis of image information acquired by the camera;

a step of overlapping the portion to be sewn of the first object to be sewn and the portion to be sewn of the second object to be sewn while aligning side portions of both the objects with each other, a step of supplying the overlapping portions of the portions to be sewn to the sewing motion portion; and a step of moving the overlapping portions synchronously with the sewing machine in such a manner that the sewing operation of the sewing machine is carried out in a state in which a distance from the side portion is fixed.

6. A sewing method using a sewing device, the sewing device comprising:

a sewing machine;

a dual-arm robot having a first arm and a second arm which can operate an object to be sewn supplied to a sewing motion portion of the sewing machine by a program control means;

a camera which is provided in the dual-arm robot and can image the sewing motion portion;

an image processing portion which processes an image information acquired by the camera; and a command transmitting portion which transmits commands to an arm control portion controlling the first arm and the second arm on the basis of a processing result of the image processing portion, and a step of making the first object to be sewn be retained by the first arm and making the second object to be sewn be retained by the second arm according to a desired motion of the first arm and the second arm which is carried out on the basis of image information acquired by the camera;

a step of overlapping the portion to be sewn of the first object to be sewn and the portion to be sewn of the second object to be sewn while aligning both end portions as seen from a sewing direction with each other;

a step of supplying the overlapping portions of the portions to be sewn to the sewing motion portion; and a step of moving the overlapping portions synchronously with the sewing machine in such a manner that the sewing operation of the sewing machine is applied to the overlapping portion.

7. A sewing method using a sewing device, the sewing device comprising:

a sewing machine;

a dual-arm robot having a first arm and a second arm which can operate an object to be sewn supplied to a sewing motion portion of the sewing machine by a program control means;

a camera which is provided in the dual-arm robot and can image the sewing motion portion;

an image processing portion which processes an image information acquired by the camera; and a command transmitting portion which transmits commands to an arm control portion controlling the first arm and the second arm on the basis of a processing result of the image processing portion, and a step of making the first object to be sewn be retained by the first arm and making the second object to be sewn be retained by the second arm according to a desired motion of the first arm and the second arm which is carried out on the basis of image information acquired by the camera;

a step of overlapping the portion to be sewn of the first object to be sewn and the portion to be sewn of the second object to be sewn while aligning both end portions as seen from a sewing direction with each other;

a step of supplying the overlapping portions of the portions to be sewn to the sewing motion portion;

a step of moving the overlapping portions synchronously with the sewing machine in such a manner that the sewing operation of the sewing machine is applied to the overlapping portion; and a step of in the case that any one of the portion to be sewn of the first object to be sewn and the portion to be sewn of the second object to be sewn elongates and increases its length during the sewing, desirably pulling a leading end portion as seen from the sewing direction of the other portion to be sewn toward a leading side in the sewing direction by the first arm and/or the second arm, thereby finally aligning end portions of the portion to be sewn of the first object to be sewn and the portion to be sewn of the second object to be sewn with each other in the leading side of the sewing direction.

8. A sewing method using a sewing device, the sewing device comprising:

a sewing machine;

a dual-arm robot having a first arm and a second arm which can operate an object to be sewn supplied to a sewing motion portion of the sewing machine by a program control means;

a camera which is provided in the dual-arm robot and can image the sewing motion portion;

an image processing portion which processes an image information acquired by the camera; and a command transmitting portion which transmits commands to an arm control portion controlling the first arm and the second arm on the basis of a processing result of the image processing portion, and a step of making the first object to be sewn be retained by the first arm and making the second object to be sewn be retained by the second arm according to a desired motion of the first arm and the second arm which is carried out on the basis of image information acquired by the camera;

a step of overlapping the portion to be sewn of the first object to be sewn and the portion to be sewn of the second object to be sewn while aligning both end portions as seen from a sewing direction with each other;

a step of supplying the overlapping portions of the portions to be sewn to the sewing motion portion;

a step of moving the overlapping portions synchronously with the sewing machine in such a manner that the sewing operation of the sewing machine is applied to the overlapping portion; and a step of gripping unsewn overlapping portions connected to the overlapping portions under the sewing in a slipping state by the first arm and/or the second arm when moving the overlapping portions.

* * * * *